(12) United States Patent
Liao et al.

(10) Patent No.: US 12,137,208 B2
(45) Date of Patent: Nov. 5, 2024

(54) TEMPORAL MERGE CANDIDATES IN MERGE CANDIDATE LISTS IN VIDEO CODING

(71) Applicant: Alibaba Innovation Private Limited, Singapore (SG)

(72) Inventors: Ru-Ling Liao, Beijing (CN); Jie Chen, Beijing (CN); Yan Ye, San Diego, CA (US); Xinwei Li, Beijing (CN)

(73) Assignee: Alibaba Innovation Private Limited, Singapore (SG)

( * ) Notice: Subject to any disclaimer, the term of this patent is extended or adjusted under 35 U.S.C. 154(b) by 93 days.

(21) Appl. No.: 17/955,525

(22) Filed: Sep. 28, 2022

(65) Prior Publication Data

US 2023/0115768 A1    Apr. 13, 2023

Related U.S. Application Data

(60) Provisional application No. 63/250,208, filed on Sep. 29, 2021.

(51) Int. Cl.
*H04N 19/105* (2014.01)
*H04N 19/139* (2014.01)
*H04N 19/172* (2014.01)

(52) U.S. Cl.
CPC ......... *H04N 19/105* (2014.11); *H04N 19/139* (2014.11); *H04N 19/172* (2014.11)

(58) Field of Classification Search
CPC ... H04N 19/105; H04N 19/139; H04N 19/172
See application file for complete search history.

(56) References Cited

U.S. PATENT DOCUMENTS

| 2015/0296197 A1* | 10/2015 | Paark | H04N 19/52 |
| | | | 382/154 |
| 2018/0310017 A1* | 10/2018 | Chen | H04N 19/52 |

(Continued)

OTHER PUBLICATIONS

"Requirements for a Future Video Coding Standard v5," International Organisation for Standardisation, Torino, IT, 14 pages (2017).

(Continued)

*Primary Examiner* — Jeremiah C Hallenbeck-Huber
(74) *Attorney, Agent, or Firm* — Finnegan, Henderson, Farabow, Garrett & Dunner, LLP

(57) ABSTRACT

A VVC-standard encoder and a VVC-standard decoder implement improvements over VVC and ECM in a number of regards: a temporal motion vector prediction candidate selection method utilizing relocation of a collocated CTU; a temporal motion vector prediction candidate selection method utilizing expanded selection range; a temporal motion vector prediction candidate selection method utilizing unconditional derivation of a scaled motion vector; a temporal motion vector prediction candidate selection method utilizing omission of scaling uni-predicted motion vectors to bi-predicted motion vectors; a temporal motion vector prediction candidate selection method utilizing multiple options in setting a reference picture index; a temporal motion vector prediction candidate selection method utilizing scaling factor offsetting; a merge candidate list building method omitting a temporal motion vector prediction candidate; and a picture reconstruction method utilizing motion information refinement.

12 Claims, 7 Drawing Sheets

(56) References Cited

U.S. PATENT DOCUMENTS

| | | | | |
|---|---|---|---|---|
| 2021/0235073 A1* | 7/2021 | Liu | ...................... | H04N 19/176 |
| 2021/0266587 A1* | 8/2021 | Liu | ...................... | H04N 19/147 |
| 2021/0344909 A1* | 11/2021 | Liu | ........................ | H04N 19/52 |
| 2021/0385483 A1* | 12/2021 | Liu | ...................... | H04N 19/513 |

OTHER PUBLICATIONS

Chang et al., "Compression efficiency methods beyond VVC," JVET-U0100, 21$^{st}$ Meeting, by teleconference, Jan. 6-15, 2021, 13 pages.

Chen et al., "Algorithm Description of Joint Exploration Test Model 7 (JEM 7)," JVET-G1001-v1, 7$^{th}$ Meeting: Torino, IT, Jul. 13-21, 2017, 50 pages.

Chen et al., "Algorithm description for Versatile Video Coding and Test Model 11 (VTM 11)," JVET-T2002-v1, 20$^{th}$ meeting by teleconference, Oct. 7-16, 2020, 104 pages.

Coban et al., Algorithm description of Enhanced Compression Model 2 (ECM 2), JVET-W2025, 23$^{rd}$ meeting, by teleconference, Jul. 7-16, 2021, 22 pages.

International Telecommunications Union "Series H: Audiovisual and Multimedia Systems Infrastructure of audiovisual services—Coding of moving video", ITU-T Telecommunication Standardization Sector of ITU, Apr. 2013, 317 pages.

JEM, https://jvet.hhi.fraunhofer.de/svn/svn_HMJEMSoftware.

Sullivan et al., "Overview of the High Efficiency Video Coding (HEVC) Standard," IEE Transactions on Circuits and Systems for Video Technology, vol. 22, No. 12, pp. 1649-1668 (2012).

Zhang et al., "EE2-3.1/EE2-3.2: Adaptive Reordering of Merge Candidates with Template/Bilateral Matching," JVET-W0090-v2, 23$^{rd}$ Meeting, by teleconference, Jul. 7-16, 2021, 5 pages.

* cited by examiner

TEMPORAL MERGE CANDIDATES IN MERGE CANDIDATE LISTS IN VIDEO CODING

RELATED APPLICATIONS

This application claims the benefit of U.S. Patent Application No. 63/250,208, entitled "IMPROVED TEMPORAL MERGE CANDIDATES IN MERGE CANDIDATE LISTS IN NEXT-GENERATION VIDEO CODING" and filed Sep. 29, 2021, which is expressly incorporated herein by reference in its entirety.

BACKGROUND

In 2020, the Joint Video Experts Team ("JVET") of the ITU-T Video Coding Expert Group ("ITU-T VCEG") and the ISO/IEC Moving Picture Expert Group ("ISO/IEC MPEG") published the final draft of the next-generation video codec specification, Versatile Video Coding ("VVC"). This specification further improves video coding performance over prior standards such as H.264/AVC (Advanced Video Coding) and H.265/HEVC (High Efficiency Video Coding). The JVET continues to propose additional techniques beyond the scope of the VVC standard itself, collected under the Enhanced Compression Model ("ECM") title.

In each of the AVC, HEVC, and VVC standards, alongside discrete cosine transform ("DCT"), motion compensation prediction ("MCP") is implemented as another central image compression technique. Images are partitioned into coding blocks; MCP improves compression efficiency of images based on the principle that motion in a block of a picture tends to recur in adjacent blocks, as well as blocks of temporally preceding and succeeding pictures. MCP is implemented in motion prediction by searching for such "motion candidates" and deriving motion information therefrom in order to reconstruct a block.

Whereas earlier standards such as HEVC implemented MCP based on only translational motion, VVC implements affine motion compensation prediction ("affine MCP") as well. Generally, motion information of spatially neighboring blocks and temporally neighboring blocks, respectively, are reconstructed based on different formats of motion vectors, and temporal motion vectors in particular are derived according to techniques based on Temporal Motion Vector Prediction ("TMVP"). In these fashions, redundant motion information is reduced in coded images, reducing bit rate required to transmit a video stream and thus achieving rate gains.

The first draft of ECM (presented at the 133rd meeting of the Moving Picture Experts Group ("MPEG") in January 2021 as "Exploration experiment on enhanced compression beyond VVC capability") includes proposals to further expand the scope of motion candidates searched according to VVC's MCP techniques. However, according to both VVC and ECM's implementations of MCP, TMVP techniques remain substantially unchanged from HEVC's implementation of MCP. Since TMVP remains an integral component of MCP, it is desired to further refine its performance so that it does not become redundant relative to other motion vector prediction techniques.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

In accordance with the VVC video coding standard (the "VVC standard") and motion prediction as described therein, computer-readable instructions stored on a computer-readable storage medium are executable by one or more processors of a computing system to configure the one or more processors to perform operations of an encoder as described by the VVC standard, and operations of a decoder as described by the VVC standard. Some of these encoder operations and decoder operations according to the VVC standard are subsequently described in further detail, though these subsequent descriptions should not be understood as exhaustive of encoder operations and decoder operations according to the VVC standard. Subsequently, a "VVC-standard encoder" and a "VVC-standard decoder" shall describe the respective computer-readable instructions stored on a computer-readable storage medium which configure one or more processors to perform these respective operations (which can be called, by way of example, "reference implementations" of an encoder or a decoder).

Moreover, according to example embodiments of the present disclosure, a VVC-standard encoder and a VVC-standard decoder further include computer-readable instructions stored on a computer-readable storage medium which are executable by one or more processors of a computing system to configure the one or more processors to perform operations not specified by the VVC standard. A VVC-standard encoder should not be understood as limited to operations of a reference implementation of an encoder, but including further computer-readable instructions configuring one or more processors of a computing system to perform further operations as described herein. A VVC-standard decoder should not be understood as limited to operations of a reference implementation of a decoder, but including further computer-readable instructions configuring one or more processors of a computing system to perform further operations as described herein.

Figure 1A:
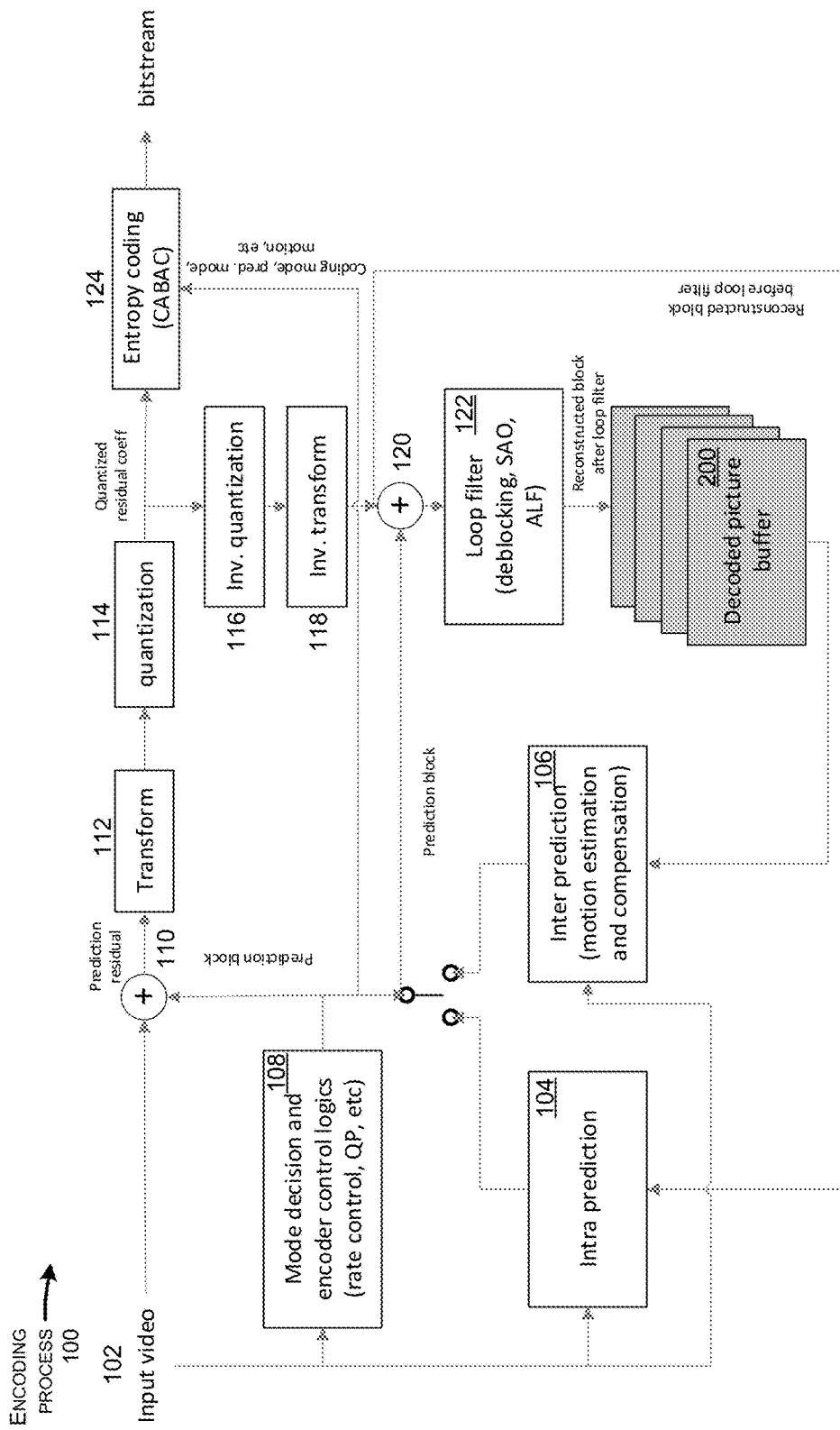
FIGS. 1A and 1B illustrate example block diagrams of, respectively, a video encoding process and a video decoding process according to example embodiments of the present disclosure.
Figure 1B:
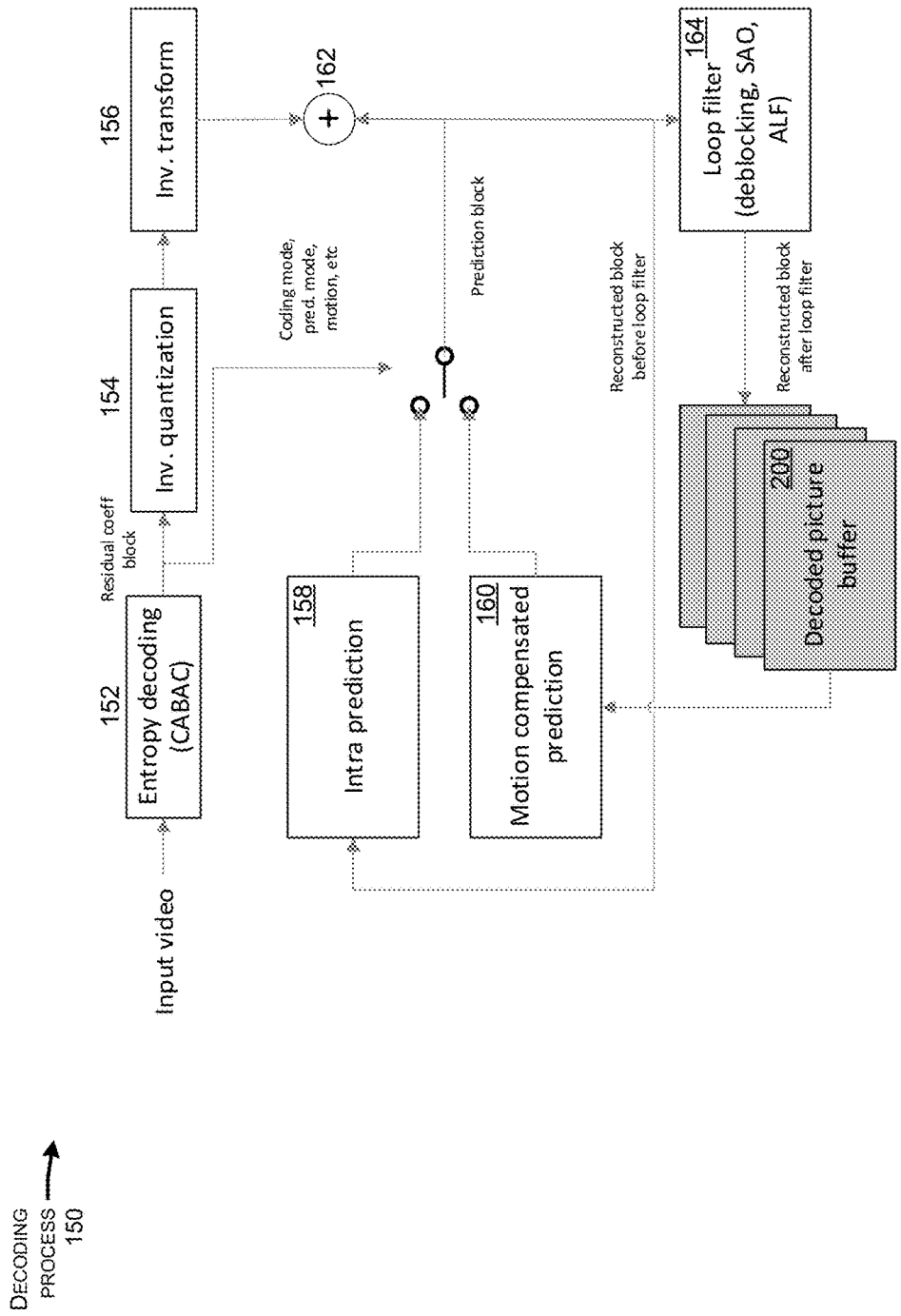

FIGS. 1A and 1B illustrate example block diagrams of, respectively, an encoding process 100 and a decoding process 150 according to an example embodiment of the present disclosure.

In an encoding process 100, a VVC-standard encoder configures one or more processors of a computing system to receive, as input, one or more input pictures from an image source 102. An input picture includes some number of pixels sampled by an image capture device, such as a photosensor array, and includes an uncompressed stream of multiple color channels (such as RGB color channels) storing color data at an original resolution of the picture, where each channel stores color data of each pixel of a picture using some number of bits. A VVC-standard encoder configures one or more processors of a computing system to store this uncompressed color data in a compressed format, wherein color data is stored at a lower resolution than the original resolution of the picture, encoded as a luma ("Y") channel and two chroma ("U" and "V") channels of lower resolution than the luma channel.

A VVC-standard encoder encodes a picture (a picture being encoded being called a "current picture," as distinguished from any other picture received from an image source 102) by configuring one or more processors of a computing system to partition the original picture into units and subunits according to a partitioning structure. A VVC-standard encoder configures one or more processors of a computing system to subdivide a picture into macroblocks ("MBs") each having dimensions of 16×16 pixels, which may be further subdivided into partitions. A VVC-standard encoder configures one or more processors of a computing system to subdivide a picture into coding tree units ("CTUs"), the luma and chroma components of which may be further subdivided into coding tree blocks ("CTBs") which are further subdivided into coding units ("CUs"). Alternatively, a VVC-standard encoder configures one or more processors of a computing system subdivide a picture into units of N×N pixels, which may then be further subdivided into subunits. Each of these largest subdivided units of a picture may generally be referred to as a "block" for the purpose of this disclosure.

A CU is coded using one block of luma samples and two corresponding blocks of chroma samples, where pictures are not monochrome and are coded using one coding tree.

A VVC-standard encoder configures one or more processors of a computing system to subdivide a block into partitions having dimensions in multiples of 4×4 pixels. For example, a partition of a block may have dimensions of 8×4 pixels, 4×8 pixels, 8×8 pixels, 16×8 pixels, or 8×16 pixels.

By encoding color information of blocks of a picture and subdivisions thereof, rather than color information of pixels of a full-resolution original picture, a VVC-standard encoder configures one or more processors of a computing system to encode color information of a picture at a lower resolution than the input picture, storing the color information in fewer bits than the input picture.

Furthermore, a VVC-standard encoder encodes a picture by configuring one or more processors of a computing system to perform motion prediction upon blocks of a current picture. Motion prediction coding refers to storing image data of a block of a current picture (where the block of the original picture, before coding, is referred to as an "input block") using motion information and prediction units ("PUs"), rather than pixel data, according to intra prediction 104 or inter prediction 106.

Motion information refers to data describing motion of a block structure of a picture or a unit or subunit thereof, such as motion vectors and references to blocks of a current picture or of a reference picture. PUs may refer to a unit or multiple subunits corresponding to a block structure among multiple block structures of a picture, such as an MB or a CTU, wherein blocks are partitioned based on the picture data and are coded according to the VVC standard. Motion information corresponding to a PU may describe motion prediction as encoded by a VVC-standard encoder as described herein.

A VVC-standard encoder configures one or more processors of a computing system to code motion prediction information over each block of a picture in a coding order among blocks, such as a raster scanning order wherein a first-decoded block is an uppermost and leftmost block of the picture. A block being encoded is called a "current block," as distinguished from any other block of a same picture.

According to intra prediction 104, one or more processors of a computing system are configured to encode a block by references to motion information and PUs of one or more other blocks of the same picture. According to intra prediction coding, one or more processors of a computing system perform an intra prediction 104 (also called spatial prediction) computation by coding motion information of the current block based on spatially neighboring samples from spatially neighboring blocks of the current block.

According to inter prediction 106, one or more processors of a computing system are configured to encode a block by references to motion information and PUs of one or more other pictures. One or more processors of a computing system are configured to store one or more previously coded and decoded pictures in a reference picture buffer for the purpose of inter prediction coding; these stored pictures are called reference pictures.

One or more processors are configured to perform an inter prediction 106 (also called temporal prediction or motion compensated prediction) computation by coding motion information of the current block based on samples from one or more reference pictures. Inter prediction may further be computed according to uni-prediction or bi-prediction: in uni-prediction, only one motion vector, pointing to one reference picture, is used to generate a prediction signal for the current block. In bi-prediction, two motion vectors, each pointing to a respective reference picture, are used to generate a prediction signal of the current block.

A VVC-standard encoder configures one or more processors of a computing system to code a CU to include reference indices to identify, for reference of a VVC-standard decoder, the prediction signal(s) of the current block. One or more processors of a computing system can code a CU to include an inter prediction indicator. An inter prediction indicator indicates list 0 prediction in reference to a first reference picture list referred to as list 0, list 1 prediction in reference to a second reference picture list referred to as list 1, or bi-prediction in reference to both reference picture lists referred to as, respectively, list 0 and list 1.

In the cases of the inter prediction indicator indicating list 0 prediction or list 1 prediction, one or more processors of a computing system are configured to code a CU including a reference index referring to a reference picture of the reference picture buffer referenced by list 0 or by list 1, respectively. In the case of the inter prediction indicator indicating bi-prediction, one or more processors of a computing system are configured to code a CU including a first reference index referring to a first reference picture of the reference picture buffer referenced by list 0, and a second reference index referring to a second reference picture of the reference picture referenced by list 1.

A VVC-standard encoder configures one or more processors of a computing system to code each current block of a picture individually, outputting a prediction block for each. According to the VVC standard, a CTU can be as large as 128×128 luma samples (plus the corresponding chroma samples, depending on the chroma format). A CTU may be further partitioned into CUs according to a quad-tree, binary tree, or ternary tree. One or more processors of a computing system are configured to ultimately record coding parameter sets such as coding mode (intra mode or inter mode), motion information (reference index, motion vectors, etc.) for inter-coded blocks, and quantized residual coefficients, at syntax structures of leaf nodes of the partitioning structure.

After a prediction block is output, a VVC-standard encoder configures one or more processors of a computing system to send coding parameter sets such as coding mode (i.e., intra or inter prediction), a mode of intra prediction or a mode of inter prediction, and motion information to an entropy coder 124 (as described subsequently).

The VVC standard provides semantics for recording coding parameter sets for a CU. For example, with regard to the above-mentioned coding parameter sets, pred_mode_flag for a CU is set to 0 for an inter-coded block, and is set to 1 for an intra-coded block; general_merge_flag for a CU is set to indicate whether merge mode is used in inter prediction of the CU; inter_affine_flag and cu_affine_type_flag for a CU are set to indicate whether affine motion compensation is used in inter prediction of the CU; mvp_l0_flag and mvp_l1_flag are set to indicate a motion vector index in list 0 or in list 1, respectively; and ref_idx_l0 and ref_idx_l1 are set to indicate a reference picture index in list 0 or in list 1, respectively. It should be understood that the VVC standard includes semantics for recording various other information, flags, and options which are beyond the scope of the present disclosure.

A VVC-standard encoder further implements one or more mode decision and encoder control settings 108, including rate control settings. One or more processors of a computing system are configured to perform mode decision by, after intra or inter prediction, selecting an optimized prediction mode for the current block, based on the rate-distortion optimization method.

A rate control setting configures one or more processors of a computing system to assign different quantization parameters ("QPs") to different pictures. Magnitude of a QP determines a scale over which picture information is quantized during encoding by one or more processors (as shall be subsequently described), and thus determines an extent to which the encoding process 100 discards picture information (due to information falling between steps of the scale) from MBs of the sequence during coding.

A VVC-standard encoder further implements a subtractor 110. One or more processors of a computing system are configured to perform a subtraction operation by computing a difference between an input block and a prediction block. Based on the optimized prediction mode, the prediction block is subtracted from the input block. The difference between the input block and the prediction block is called prediction residual, or "residual" for brevity.

Based on a prediction residual, a VVC-standard encoder further implements a transform 112. One or more processors of a computing system are configured to perform a transform operation on the residual by a matrix arithmetic operation to derive an array of coefficients (which can be referred to as "residual coefficients," "transform coefficients," and the like), thereby encoding a current block as a transform block ("TB"). Transform coefficients may refer to coefficients representing one of several spatial transformations, such as a diagonal flip, a vertical flip, or a rotation, which may be applied to a sub-block.

It should be understood that a coefficient can be stored as two components, an absolute value and a sign, as shall be described in further detail subsequently.

Sub-blocks of CUs, such as PUs and TBs, can be arranged in any combination of sub-block dimensions as described above. A VVC-standard encoder configures one or more processors of a computing system to subdivide a CU into a residual quadtree ("RQT"), a hierarchical structure of TBs. The RQT provides an order for motion prediction and residual coding over sub-blocks of each level and recursively down each level of the RQT.

A VVC-standard encoder further implements a quantization 114. One or more processors of a computing system are configured to perform a quantization operation on the residual coefficients by a matrix arithmetic operation, based on a quantization matrix and the QP as assigned above. Residual coefficients falling within an interval are kept, and residual coefficients falling outside the interval step are discarded.

A VVC-standard encoder further implements an inverse quantization 116 and an inverse transform 118. One or more processors of a computing system are configured to perform an inverse quantization operation and an inverse transform operation on the quantized residual coefficients, by matrix arithmetic operations which are the inverse of the quantization operation and transform operation as described above. The inverse quantization operation and the inverse transform operation yield a reconstructed residual.

A VVC-standard encoder further implements an adder 120. One or more processors of a computing system are configured perform an addition operation by adding a prediction block and a reconstructed residual, outputting a reconstructed block.

A VVC-standard encoder further implements a loop filter 122. One or more processors of a computing system are configured to apply a loop filter, such as a deblocking filter, a sample adaptive offset ("SAO") filter, and adaptive loop filter ("ALF") to a reconstructed block, outputting a filtered reconstructed block.

A VVC-standard encoder further configures one or more processors of a computing system to output a filtered reconstructed block to a decoded picture buffer ("DPB") 200. A DPB 200 stores reconstructed pictures which are used by one or more processors of a computing system as reference pictures in coding pictures other than the current picture, as described above with reference to inter prediction.

A VVC-standard encoder further implements an entropy coder 124. One or more processors of a computing system are configured to perform entropy coding, wherein, according to the Context-Sensitive Binary Arithmetic Codec ("CABAC"), symbols making up quantized residual coefficients are coded by mappings to binary strings (subsequently "bins"), which can be transmitted in an output bitstream at a compressed bitrate. The symbols of the quantized residual coefficients which are coded include absolute values of the residual coefficients (these absolute values being subsequently referred to as "residual coefficient levels").

However, although residual coefficient levels are predicted and coded, residual coefficient signs are signaled using bins indicating equiprobable (subsequently "EP") states (it should be understood that coefficients having value 0 have no sign and therefore need not be signaled). A VVC-standard encoder does not configure one or more processors of a computing system to predict residual coefficient signs, due to computational challenges (which will be appreciated by persons skilled in the art, but need not be reiterated herein for understanding example embodiments of the present disclosure). For these reasons, CABAC configures one or more processors of a computing system to bypass the coding of residual coefficient signs, resulting in added transmission of 1 bit per sign in an output bitstream.

Thus, the entropy coder configures one or more processors of a computing system to code residual coefficient levels of a block; bypass coding of residual coefficient signs and record the residual coefficient signs with the coded block; record coding parameter sets such as coding mode, a mode of intra prediction or a mode of inter prediction, and motion information coded in syntax structures of a coded block (such as a picture parameter set ("PPS") found in a picture header, as well as a sequence parameter set ("SPS") found in a sequence of multiple pictures); and output the coded block.

A VVC-standard encoder configures one or more processors of a computing system to output a coded picture, made up of coded blocks from the entropy coder 124. The coded picture is output to a transmission buffer, where it is ultimately packed into a bitstream for output from the VVC-standard encoder.

In a decoding process 150, a VVC-standard decoder configures one or more processors of a computing system to receive, as input, one or more coded pictures from a bitstream.

A VVC-standard decoder implements an entropy decoder 152. One or more processors of a computing system are configured to perform entropy decoding, wherein, according to CABAC, bins are decoded by reversing the mappings of symbols to bins, thereby recovering the entropy-coded quantized residual coefficients. The entropy decoder 152 outputs the quantized residual coefficients, outputs the coding-bypassed residual coefficient signs, and also outputs the syntax structures such as a PPS and a SPS.

A VVC-standard decoder further implements an inverse quantization 154 and an inverse transform 156. One or more processors of a computing system are configured to perform an inverse quantization operation and an inverse transform operation on the decoded quantized residual coefficients, by matrix arithmetic operations which are the inverse of the quantization operation and transform operation as described above. The inverse quantization operation and the inverse transform operation yield a reconstructed residual.

Furthermore, based on coding parameter sets recorded in syntax structures such as PPS and a SPS by the entropy coder 124 (or, alternatively, received by out-of-band transmission or coded into the decoder), and a coding mode included in the coding parameter sets, the VVC-standard decoder determines whether to apply intra prediction 156 (i.e., spatial prediction) or to apply motion compensated prediction 158 (i.e., temporal prediction) to the reconstructed residual.

In the event that the coding parameter sets specify intra prediction, the VVC-standard decoder configures one or more processors of a computing system to perform intra prediction 156 using prediction information specified in the coding parameter sets. The intra prediction 156 thereby generates a prediction signal.

In the event that the coding parameter sets specify inter prediction, the VVC-standard decoder configures one or more processors of a computing system to perform motion compensated prediction 158 using a reference picture from a DPB 200. The motion compensated prediction 158 thereby generates a prediction signal.

A VVC-standard decoder further implements an adder 160. The adder 160 configures one or more processors of a computing system to perform an addition operation on the reconstructed residuals and the prediction signal, thereby outputting a reconstructed block.

A VVC-standard decoder further implements a loop filter 162. One or more processors of a computing system are configured to apply a loop filter, such as a deblocking filter, a SAO filter, and ALF to a reconstructed block, outputting a filtered reconstructed block.

A VVC-standard decoder further configures one or more processors of a computing system to output a filtered reconstructed block to the DBP 200. As described above, a DPB 200 stores reconstructed pictures which are used by one or more processors of a computing system as reference pictures in coding pictures other than the current picture, as described above with reference to motion compensated prediction.

A VVC-standard decoder further configures one or more processors of a computing system to output reconstructed pictures from the DPB to a user-viewable display of a computing system, such as a television display, a personal computing monitor, a smartphone display, or a tablet display.

Therefore, as illustrated by an encoding process 100 and a decoding process 150 as described above, a VVC-standard encoder and a VVC-standard decoder each implements motion prediction coding in accordance with the VVC specification. A VVC-standard encoder and a VVC-standard decoder each configures one or more processors of a computing system to generate a reconstructed picture based on a previous reconstructed picture of a DPB according to motion compensated prediction as described by the VVC standard, wherein the previous reconstructed picture serves as a reference picture in motion compensated prediction as described herein.

As described above with reference to coding parameter sets, for a reconstructed picture coded by inter prediction coding, a VVC-standard encoder and a VVC-standard decoder implement merge mode and affine motion compensation for inter prediction of reconstructed blocks. A VVC-standard encoder and a VVC-standard decoder implement multiple merge modes for inter prediction of motion information of a CU of a reconstructed picture, including motion compensated prediction ("MCP"), affine motion compensated prediction ("affine MCP"), and other merge modes as specified by the VVC standard. The motion information may include a plurality of motion vectors.

Motion information of a CU of a reconstructed picture may further include a motion candidate list. According to the VVC standard, a motion candidate list may be a data structure containing references to multiple motion candidates. A motion candidate can be a block structure or a subunit thereof, such as a pixel or any other suitable subdivision of a block structure of a current picture, or can be a reference to a motion candidate of another picture. A motion candidate can be a spatial motion candidate or a temporal motion candidate. By applying motion vector compensation ("MVC"), a VVC-standard decoder may select a motion candidate from the motion candidate list and derive a motion vector of the motion candidate as a motion vector of the CU of the reconstructed picture.

Figure 3:
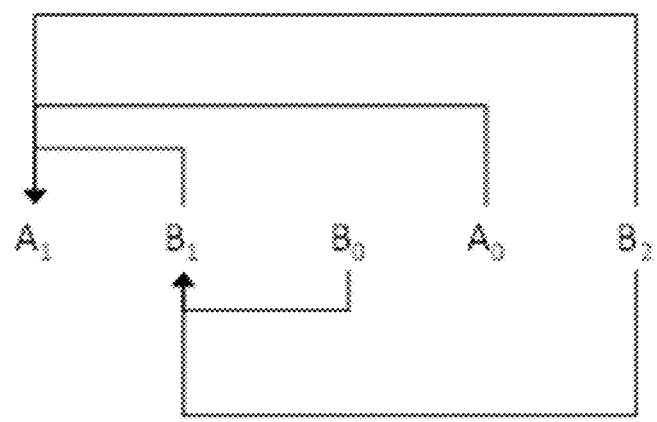
FIG. 3 illustrates an example selection of motion candidates for a CU of a picture according to motion prediction coding according to the VVC standard.

FIG. 3 illustrates an example selection of motion candidates for a CU of a picture according to merge mode coding according to the VVC standard.

According to the VVC standard, a motion candidate list can be a merge candidate list and may include up to five types of merge candidates (six according to ECM, as shall be described subsequently). A VVC-standard encoder can implement coding of a syntax structure of a CU to include a merge index.

For each CU coded in merge mode, an index of most optimal merge candidates is encoded using truncated unary binarization (TU).

A merge candidate list for a CU of a picture coded according to a merge mode may include the following merge candidates, in order:
Spatial MVP candidates from spatially neighboring CUs to the current CU;
Temporal MVP candidates ("TMVP candidates") from collocated CUs of the current CU;
History-based MVP candidates from a FIFO table;
Pairwise average MVP candidates; and
A zero motion vector.

Figure 2:
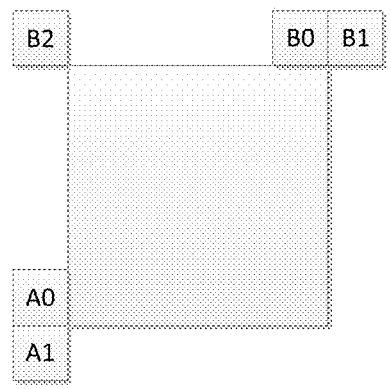
FIG. 2 illustrates multiple spatially neighboring blocks of a current CU of a picture.

As FIG. 2 illustrates, multiple spatially neighboring blocks of a current CU of a picture are present. Spatially neighboring blocks of the current CU include blocks neighboring a left edge of the current CU and blocks neighboring an upper edge of the current CU. Spatially neighboring blocks have left-right relationships and above-below relationships to the current CU as illustrated in FIG. 2. By the example of FIG. 2, a merge candidate list for a picture coded according to a merge mode can include up to the following merge candidates:
A left spatially neighboring block ($A_0$);
An upper spatially neighboring block ($B_0$);
An upper-right spatially neighboring block ($B_1$);
A lower-left spatially neighboring block ($A_1$); and
An upper-left spatially neighboring block ($B_2$).

Of the spatially neighboring blocks shown herein, block $A_0$ is a block left of the current CU; block $A_1$ is a block left of the current CU; block $B_0$ is a block above the current CU; block $B_1$ is a block above the current CU; and block $B_2$ is a block above the current CU. Relative positioning of each spatially neighboring block to the current CU, or relative to each other, shall not be limited further beyond these relationships, and there shall be no limitation as to relative sizes of each spatially neighboring block to the current CU or to each other.

A VVC-standard encoder and a VVC-standard decoder implement deriving at most four merge candidates from searching spatially neighboring blocks left of the current CU and searching spatially neighboring blocks above the current CU. These spatially neighboring blocks may be searched in the order of $B_0$, $A_0$, $B_1$, $A_1$, and $B_2$. Any of these spatially neighboring blocks may be available for the merge candidate list as long as they do not belong to another slice or tile. Thus, $B_2$ will only be added to the merge candidate list in the event that any of the other four spatially neighboring blocks is not available, or is intra coded.

For each spatially neighboring block found available, a merge candidate is derived from the motion of that spatially neighboring block and added to the merge candidate list. After the $A_1$ candidate is added in this manner, upon finding any further candidates, a VVC-standard encoder and a VVC-standard decoder further implement performing a redundancy check; a candidate which contains the same motion information as another candidate should not be added to the list. However, to reduce computational complexity, not all possible candidate pairs are considered in the redundancy check. Instead, only the pairs linked with an arrow as illustrated in FIG. 3 are considered, and a candidate is only added to the list if the corresponding candidate used for redundancy check has not the same motion information.

Next, only one temporal merge candidate is added to the list. Particularly, in the derivation of this temporal merge candidate, a scaled motion vector is derived based on a collocated CU belonging to a collocated reference picture. A VVC-standard encoder implements explicitly signaling the reference picture list and the reference index to be used for derivation of the collocated CU in a slice header.

It should be understood that the VVC standard defines a "collocated picture" as a picture having a same spatial resolution, same scaling window offsets, a same number of subpictures, and a same CTU size as a current picture.

Figure 4:
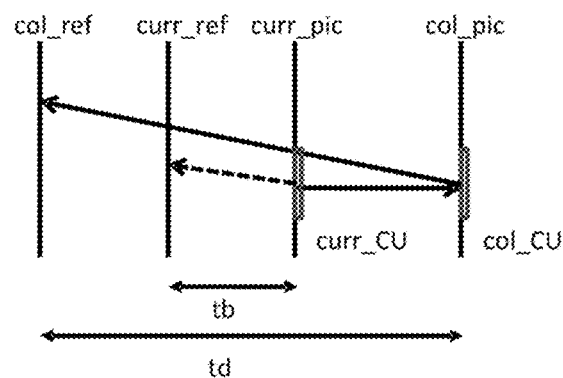
FIG. 4 illustrates obtaining the scaled motion vector for temporal merge candidate, according to the VVC standard.

FIG. 4 illustrates obtaining the scaled motion vector for temporal merge candidate, according to the VVC standard, by a dotted line; the scaled motion vector is scaled from the motion vector of the collocated CU using the picture order count ("POC") distances, tb and td, where tb denotes a POC difference between the reference picture of the current picture and the current picture, and td denotes a POC difference between the collocated picture and the reference picture of the collocated picture. The reference picture index of temporal merge candidate is set equal to zero.

It should be understood that in deriving a temporal merge candidate, a VVC-standard encoder and a VVC-standard decoder implement deriving the scaled motion vector from one of a L0 motion vector and a L1 motion vector of the collocated CU, wherein the one of a L0 motion vector and a L1 motion vector of the collocated CU is determined according to the following steps:

If the motion vector of the collocated CU is a bi-predicted motion vector and the current picture is a low delay picture, the L0 motion vector of the TMVP candidate is scaled from the L0 motion vector of the collocated CU and the L1 motion vector of the TMVP candidate is scaled from the L1 motion vector of the collocated CU.

Otherwise, if the motion vector of the collocated CU is a bi-predicted motion vector and the current picture is a non-low delay picture, a VVC-standard encoder and a VVC-standard decoder implement determining one of the two motion vectors of the collocated CU as a basis for scaling, according to the reference picture list of the collocated CU. More specific, if the collocated CU is from the L0 reference picture list, the L0 and L1 motion vectors of the TMVP candidate are both scaled from the L1 motion vector of the collocated CU. Similarly, if the collocated CU is from the L1 reference picture list, the L0 and L1 motion vectors of the TMVP candidate are both scaled from the L0 motion vector of the collocated CU.

Otherwise, if the motion vector of the collocated CU is a L0-predicted motion vector, the L0 and L1 motion vector of the TMVP candidate are both scaled from the L0 motion vector of the collocated CU no matter whether the current picture is a low-delay picture or not. Similarly, if the motion vector of the collocated CU is a L1-predicted motion vector, the L0 and L1 motion vectors of the TMVP candidate are both scaled from the L1 motion vector of the collocated CU.

Figure 5:
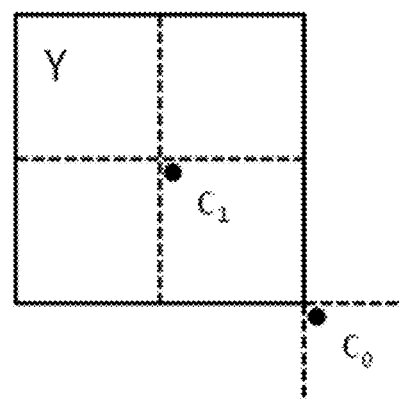
FIG. 5 illustrates selection of the position for the temporal candidate between candidates $C_0$ and $C_1$, according to the VVC standard.

FIG. 5 illustrates selection of the position for the temporal candidate between candidates $C_0$ and $C_1$, where the block outlined in solid lines denotes a location of a current CU, according to the VVC standard. If a collocated CU at position $C_0$ is not available, is intra coded, or is outside of the current row of CTUs, a VVC-standard encoder and a VVC-standard decoder implement deriving the temporal merge candidate using a collocated CU at position $C_1$. Otherwise, a VVC-standard encoder and a VVC-standard decoder implement deriving the temporal merge candidate using a collocated CU at position $C_0$.

Thus, it should be understood that according to the VVC standard, the temporal candidate is derived from either a collocated CU relatively positioned at a lower right corner of the current CU, or a collocated CU relatively positioned at a center of the current CU.

Next, a VVC-standard encoder and a VVC-standard decoder implement adding history-based MVP ("HMVP") merge candidates to the merge candidate list after the spatial MVP candidate and TMVP candidate. Herein, the motion information of a previously coded block is stored in a table and used as an MVP candidate for the current CU. The table with multiple HMVP candidates is maintained during the encoding/decoding process. The table is reset (emptied) when a new CTU row is encountered. Whenever there is a non-subunit inter-coded CU, the associated motion information is added to the last entry of the table as a new HMVP candidate.

The HMVP table size S is set to be 6, which indicates that up to five HMVP candidates may be added to the table. When inserting a new motion candidate to the table, a VVC-standard encoder and a VVC-standard decoder implement constrained first-in-first-out ("FIFO") processing, wherein redundancy check is firstly applied to find whether there is an identical HMVP in the table. If found, the identical HMVP is removed from the table and all the HMVP candidates afterwards are moved forward, and the identical HMVP is inserted to the last entry of the table.

HMVP candidates could be used in the merge candidate list construction process. The latest several HMVP candidates in the table are checked in order and inserted to the candidate list after the TMVP candidate. Redundancy check is applied on the HMVP candidates to the spatial or temporal merge candidate.

To reduce the number of redundancy check operations, the following simplifications are introduced:

The last two entries in the table are redundancy checked to $A_1$ and $B_1$ spatial candidates, respectively.

Once the total number of available merge candidates reaches the maximally allowed merge candidates less 1, the merge candidate list construction process from HMVP is terminated.

Next, a VVC-standard encoder and a VVC-standard decoder implement generating pairwise average candidates by averaging predefined pairs of candidates in the existing merge candidate list, using the first two merge candidates. The first merge candidate is defined as p0Cand and the second merge candidate can be defined as p1Cand, respectively. The averaged motion vectors are calculated according to the availability of the motion vector of p0Cand and p1Cand separately for each reference list. If both motion vectors are available in one list, these two motion vectors are averaged even when they point to different reference pictures, and its reference picture is set to the one of p0Cand; if only one motion vector is available, use the one directly; if no motion vector is available, keep this list invalid. Also, if the half-pel interpolation filter indices of p0Cand and p1Cand are different, it is set to 0.

Finally, in the event that the merge list is not full after pair-wise average merge candidates are added, zero MVPs are inserted at the end until the maximum merge candidate number is encountered. A zero motion vector may have a motion shift of (0, 0).

Whereas the VVC standard provides for a merge candidate list of six candidates at most, the JVET's continuing work in this area beyond the scope of the VVC standard (presented at the 133rd meeting of the Moving Picture Experts Group ("MPEG") in January 2021 as "Exploration experiment on enhanced compression beyond VVC capability", and at the 136th meeting of the MPEG in October 2021 as "Algorithm description of Enhanced Compression Model 3 (ECM 3)" proposes an expanded merge candidate list of fifteen candidates at most, including the following candidates, in order:

Spatial MVP candidates from spatially neighboring CUs to the current CU;
Temporal MVP candidates from collocated CUs of the current CU;
Non-adjacent spatial candidates;
History-based MVP candidates from a FIFO table;
Pairwise average MVP candidates; and
A zero motion vector.

Figure 6:
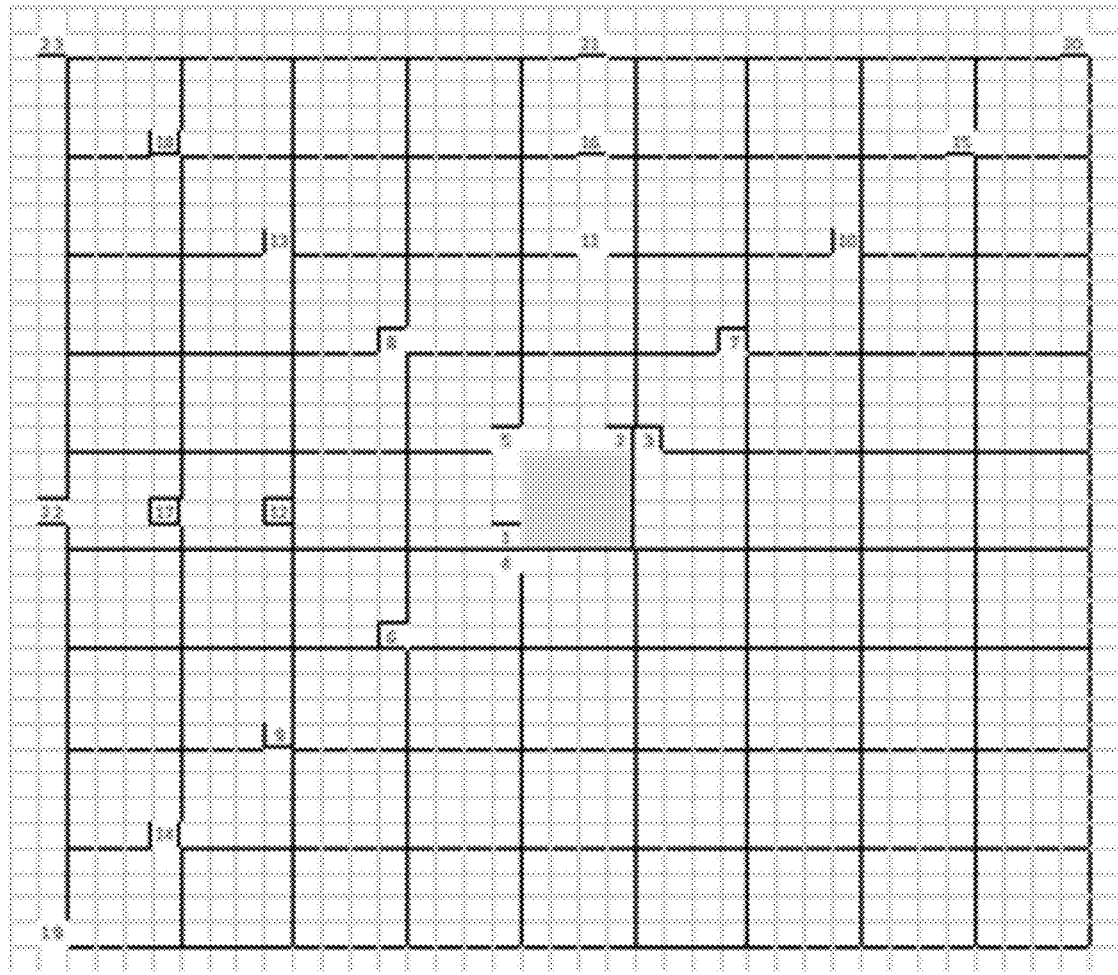
FIG. 6 illustrates possible spatial neighboring blocks from which not only adjacent, but also non-adjacent spatial merge candidates may be derived, according to ECM 3.

FIG. 6 illustrates possible spatial neighboring blocks from which not only adjacent, but also non-adjacent spatial merge candidates may be derived, according to ECM 3. Non-adjacent spatial merge candidates are inserted after the TMVP candidate in the regular merge candidate list. The distances between non-adjacent spatial candidates and current coding block are based on the width and height of current coding block. The line buffer restriction is not applied.

Moreover, after the merge candidate list is constructed, the merge candidates are reordered (according to Adaptive Reordering of Merge Candidates, hereinafter referred to as "ARMC"). The merge candidates are firstly divided into several subgroups. The subgroup size is set to 5 for regular merge mode and TM merge mode. The subgroup size is set to 3 for affine merge mode. Merge candidates in each subgroup are reordered ascendingly according to cost values based on template matching. For simplification, merge candidates in the last but not the first subgroup are not reordered. The template matching cost of a merge candidate is measured by the sum of absolute differences ("SAD") between samples of a template of the current block and their corresponding reference samples. The template includes a set of reconstructed samples neighboring to the current block. Reference samples of the template are located by the motion information of the merge candidate.

ECM 3's merge candidate list search techniques focus on expanding the scope of the merge candidate search, but neither the VVC standard nor the ECM proposals have improved performance of TMVP techniques, as TMVP candidates continue to occupy only one position in the merge candidate list. Consequently, it is increasingly likely that the TMVP candidate will underperform compared to other merge candidates. It is desired to refine TMVP performance so that it remains competitive with merge candidates based on other motion prediction techniques in a merge candidate list.

Therefore, example embodiments of the present disclosure provide a temporal motion vector prediction candidate selection method which provides improvements over VVC and ECM in a number of regards.

In one or more aspects, example embodiments of the present disclosure provide a VVC-standard encoder and a VVC-standard decoder implementing a temporal motion vector prediction candidate selection method utilizing relocation of a collocated CTU.

In one or more aspects, example embodiments of the present disclosure provide a VVC-standard encoder and a VVC-standard decoder implementing a temporal motion vector prediction candidate selection method utilizing expanded selection range.

In one or more aspects, example embodiments of the present disclosure provide a VVC-standard encoder and a VVC-standard decoder implementing a temporal motion vector prediction candidate selection method utilizing unconditional derivation of a scaled motion vector.

In one or more aspects, example embodiments of the present disclosure provide a VVC-standard encoder and a VVC-standard decoder implementing a temporal motion vector prediction candidate selection method utilizing omission of scaling uni-predicted motion vectors to bi-predicted motion vectors.

In one or more aspects, example embodiments of the present disclosure provide a VVC-standard encoder and a VVC-standard decoder implementing a temporal motion vector prediction candidate selection method utilizing multiple options in setting a reference picture index.

In one or more aspects, example embodiments of the present disclosure provide a VVC-standard encoder and a VVC-standard decoder implementing a temporal motion vector prediction candidate selection method utilizing scaling factor offsetting.

In one or more aspects, example embodiments of the present disclosure provide a VVC-standard encoder and a VVC-standard decoder implementing a merge candidate list building method omitting a temporal motion vector prediction candidate.

In one or more aspects, example embodiments of the present disclosure provide a VVC-standard encoder and a VVC-standard decoder implementing a picture reconstruction method utilizing motion information refinement.

Subsequently, each of the above aspects of example embodiments of the present disclosure is described in further detail.

According to ECM design, to minimize the on-chip buffer size of temporal motion, a temporal motion vector can only be obtained from a collocated CTU plus one column located to the right of the collocated CTU, where the collocated CTU is a CTU in the collocated reference picture whose position is the same as that of the current CTU. However, this design is not suitable for sequences with fast motion or is not suitable for a picture whose collocated reference picture is far away (that is, the POC distance between the picture and its collocated reference picture is large). Therefore, example embodiments of the present disclosure provide a VVC-standard encoder and a VVC-standard decoder allowing temporal motion vectors to be derived from positions other than the collocated CTU.

Figure 7A:
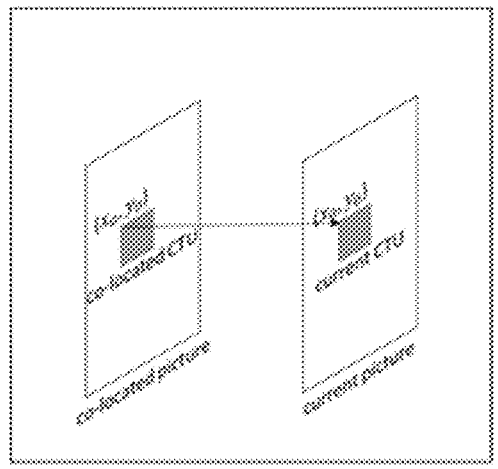
FIGS. 7A and 7B illustrate, respectively, a temporal motion vector prediction candidate selection method according to ECM compared to a temporal motion vector prediction candidate selection method utilizing relocation of a collocated CTU according to example embodiments of the present disclosure.
Figure 7B:
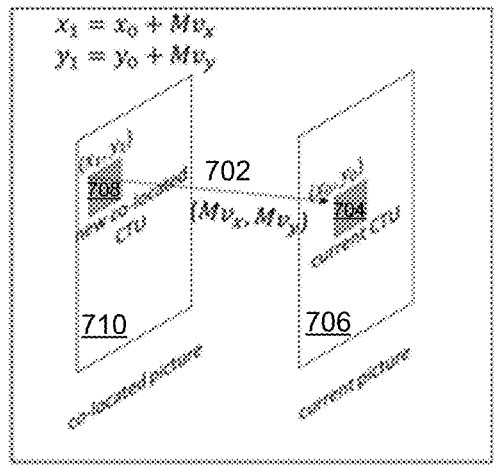

FIGS. 7A and 7B illustrate, respectively, a temporal motion vector prediction candidate selection method according to ECM compared to a temporal motion vector prediction candidate selection method utilizing relocation of a collocated CTU according to example embodiments of the present disclosure. First, block partitioning of a picture effectively splits a picture into multiple grids of blocks, where some grids of a picture may have larger block sizes while others have smaller block sizes. For each grid of a picture, a motion vector is signaled to indicate where the temporal motion of the grid comes from; thus, such grids are called "motion grids" for brevity, as grid granularity determines the distribution of motion vectors.

FIGS. 7A and 7B illustrate an example wherein motion grid sizes of a current block and a collocated block are equal to the size of CTU: the left figure illustrates the ECM proposal, whereas the right figure illustrates the present disclosure. According to example embodiments of the present disclosure, a VVC-standard encoder and a VVC-standard decoder implement changing a position of a collocated CTU according to a signaled motion vector 702. In other words, a VVC-standard encoder and a VVC-standard decoder derive, according to a motion vector 702 (which can be, but is not necessarily, signaled, as shall be subsequently described), a TMVP candidate of a current CU of the current CTU 704 of a current picture 706 from a relocated collocated CTU 708 of a collocated picture 710, the relocated collocated CTU 708 being located in the collocated picture 710 by the motion vector 702 relative to the current CTU 704 in the current picture 706.

It should be understood that "changing a position" of a collocated CTU 708 or "relocating" a collocated CTU 708, according to example embodiments of the present disclosure, does not mean that picture data of the collocated picture 710 is moved. Rather, "changing a position" or "relocating" a collocated CTU 708 should be understood as a VVC-standard encoder and a VVC-standard decoder implementing operations described herein as using a collocated CTU 708. Instead of the collocated CTU 708 being necessarily located alike in the collocated picture 710 to the current CTU 704 in the current picture 706, another CTU of the collocated picture 710 (which can be, but need not be, located differently relative to the current CTU 704) is substituted for the collocated CTU 708 in implementing each such operation.

Alternatively, motion grid size of a current block and a collocated block can be different from the size of CTU. In one example, motion grid size can be N×N, wherein N is equal to 256, 128, 64, 32 or 16 luma samples. In other example, motion grid size can be N×M, wherein N is not equal to M, and N and M are both integer powers of 2.

Motion grid size can differ depending on differences in sequences, temporal layer or picture type resulting in different block partitioning. According to some example embodiments, a VVC-standard encoder and a VVC-standard decoder implement signaling a motion grid size of a current block at a sequence-level, picture-level or slice-level syntax structure. According to other example embodiments, the motion grid size is adjusted according to temporal layer.

It should be understood for the purpose of understanding the present disclosure that where a VVC-standard encoder and a VVC-standard decoder implement signaling a parameter in a syntax structure, an encoder implements recording the parameter in syntax structures of blocks, pictures, sequences, slices, and the like, and transmitting the coded syntax structures over a bitstream; and an encoder implements parsing the coded syntax structures from the bitstream.

A VVC-standard encoder and a VVC-standard decoder can implement signaling the motion grid size of the highest temporal layer at a sequence-level syntax structure, or can implement a fixed motion grid size of the highest temporal layer, such as the same size as a CTU. Then, a VVC-standard encoder and a VVC-standard decoder implement decreasing motion grid size for every lower temporal layer; this is because in a lower temporal layer, the POC distance between a picture and its collocated reference picture is large. Thus, motion is more complex and fine-grained in a lower temporal layer than in a higher temporal layer, and so smaller granularity can improve the accuracy of temporal motion prediction.

In addition, a VVC-standard encoder and a VVC-standard decoder can implement signaling the motion grid size of the lowest temporal layer in a syntax structure, and implement increasing motion grid size for every higher temporal layer.

For the purpose of signaling the motion vector for each motion grid, the motion vector can be directly signaled or can be predicted. According to some example embodiments, the motion vector of a current motion grid can be merged from any of its neighboring motion grids (e.g., a left or top neighboring motion grid according to raster scanning order coding, or any other neighboring motion grid of a block that has been previously coded according to other scanning orders as described below). A VVC-standard encoder and a VVC-standard decoder implement signaling a parameter (e.g., a flag or an index) in a syntax structure to indicate whether the motion vector of the current motion grid is the same as those of its neighboring motion grid. If the signaled parameter indicates sameness, the motion vector of the current motion grid is not signaled and is directly inherited from its neighboring motion grids. Otherwise, the motion vector of the current motion grid is signaled in a syntax structure.

Alternatively, the motion vector of a current motion grid can be predicted from its neighboring motion grids. A VVC-standard encoder and a VVC-standard decoder implement utilizing the motion vector of neighboring motion grid as a motion vector predictor of the current motion grid. Rather than signaling the above-described parameters, only the motion vector difference is signaled in a syntax structure.

Moreover, where the motion vector for each motion grid is signaled in a syntax structure, a VVC-standard encoder and a VVC-standard decoder implement coding the motion grids according to a default order, where the default order can be one of raster scanning order, z-order scanning order, horizontal scanning order, vertical scanning order, and diagonal scanning order.

It should be understood that the collocated CTU can be at the best position for a temporal motion vector, such that the signaled motion vector is equal to zero motion. Therefore, to reduce the signaling overhead, a VVC-standard encoder and a VVC-standard decoder implementing signaling control parameters in a syntax structure determining whether the position of the collocated CTU is relocated from the current CTU.

According to other example embodiments, a VVC-standard encoder and a VVC-standard decoder implement signaling a sequence-level, picture-level, or slice-level syntax structure flag to indicate whether the position of the collocated CTU is relocated from the current CTU.

According to other example embodiments, the position of the collocated CTU of higher temporal layer remains unchanged from the current CTU, and no other parameters need to be signaled.

In one or more aspects, example embodiments of the present disclosure provide a temporal motion vector prediction candidate selection method utilizing expanded selection range.

According to VVC and ECM as described above with reference to FIG. 5, the position for the temporal candidate can only be selected from candidates $C_0$ and $C_1$ as illustrated in FIG. 5. Thus, example embodiments of the present disclosure provide selection of temporal candidates from additional positions.

According to some example embodiments, a VVC-standard encoder and a VVC-standard decoder implement selecting the temporal candidate from the combined set of $C_0$ and $C_1$ ("temporal candidates") as illustrated in FIG. 5 and $A_0$, $A_1$, $B_0$, $B_1$, and $B_2$ ("spatial candidates") as illustrated in FIG. 2 (i.e., spatially neighboring blocks as described with reference to FIG. 2, but relative to a location of current CU illustrated in FIG. 5).

According to some example embodiments, a VVC-standard encoder and a VVC-standard decoder implement selecting the temporal candidate according to a default order. The default order is $C_0$, then $C_1$, then $B_0$, then $A_0$, then $A_1$, then $B_1$, then $B_2$. If a CU at position $C_0$ is not available, is intra coded, or is outside of the current row of CTUs, position $C_1$ is checked. Otherwise, position $C_0$ is used in the derivation of the TMVP candidate, and the search ends. Similarly, if CU at position $C_1$ is not available, is intra coded, or is outside of the current row of CTUs, position $B_0$ is checked, and so on. The default order according to example embodiments of the present disclosure can be any combination of $C_0$, $C_1$, $A_0$, $A_1$, $B_0$, $B_1$, and $B_2$, without limitation.

According to other example embodiments, a VVC-standard encoder and a VVC-standard decoder implement deriving the TMVP candidate by averaging all the temporal motion vectors of temporal candidates. The temporal motion vectors of the temporal candidates are normalized by scaling to a fixed reference picture, and then the normalized temporal motion vectors are averaged.

According to other example embodiments, a VVC-standard encoder and a VVC-standard decoder implement deriving the TMVP candidate by comparing the temporal motion vector of temporal candidates with spatial merge candidates. The temporal motion vector which yields the largest motion vector difference on comparison is used in the derivation of the TMVP candidate.

According to other example embodiments, a VVC-standard encoder and a VVC-standard decoder implement selecting the TMVP candidate from temporal motion vectors of temporal candidates according to respective cost values of template matching. The template matching cost of a temporal candidate is measured by the SAD between samples of a template of the current block and their corresponding reference samples. The template comprises a set of reconstructed samples neighboring the current block. Reference samples of the template are located by the motion information of the temporal candidates.

According to other example embodiments, instead of indirectly determining where the TMVP candidate is selected from, the derivation of the TMVP candidate may be explicitly signaled instead. A VVC-standard encoder and a VVC-standard decoder implement obtaining the temporal candidates from the set including $\{C_0, C_1, A_0, A_1, B_0, B_1, B_2\}$. The temporal candidates can be any subset of $\{C_0, C_1, A_0, A_1, B_0, B_1, B_2\}$. The temporal candidates can also be obtained from any position within collocated CTU.

A VVC-standard encoder and a VVC-standard decoder implement signaling an index in a syntax structure of each CTU to identify derivation of the TMVP candidate. For example, a signaled index of 0 identifies the TMVP candidate is derived from the $C_0$ position; a signaled index of 1 identifies the TMVP candidate is derived from the $C_1$ position; and so on. The index can be signaled at syntax structures of different granularities, such as sequence-level, picture-level, slice-level, 64×64 grid-level, 32×32 grid-level, 16×16 grid-level, and the like.

In one or more aspects, example embodiments of the present disclosure provide a VVC-standard encoder and a VVC-standard decoder implementing a temporal motion vector prediction candidate selection method utilizing unconditional derivation of a scaled motion vector.

According to ECM, a temporal motion vector is scaled from either L0 or L1 temporal motion conditionally on whether a current picture is a low delay picture. According to example embodiments of the present disclosure, this condition may be omitted: thus, in deriving a temporal merge candidate, a VVC-standard encoder and a VVC-standard decoder implement deriving the scaled motion vector from one of the motion vectors of the collocated CU, wherein the one of the motion vectors of the collocated CU is determined according to the following steps:

If the motion vector of the collocated CU is a bi-predicted motion vector, then regardless of whether the current picture is a low delay picture or not, the L0 motion vector of the TMVP candidate is scaled from the L0 motion vector of the collocated CU and the L1 motion vector of the TMVP candidate is scaled from the L1 motion vector of the collocated CU.

Otherwise, if the motion vector of the collocated CU is a L0-predicted motion vector, the L0 and L1 motion vectors of the TMVP candidate are both scaled from the L0 motion of the collocated CU regardless of whether the current picture is a low-delay picture or not. Similarly, if the motion vector of the collocated CU is a L1-predicted motion vector, the L0 and L1 motion vectors of the TMVP candidate are both scaled from the L1 motion vector of the collocated CU.

In one or more aspects, example embodiments of the present disclosure provide a VVC-standard encoder and a VVC-standard decoder implementing a temporal motion vector prediction candidate selection method utilizing omission of scaling uni-predicted motion vectors to bi-predicted motion vectors.

According to ECM, motion vectors of a TMVP candidate are always derived by bi-predicted motion regardless of whether the motion of the collocated CU is uni-predicted or bi-predicted. Scaling an uni-predicted motion vector to a bi-predicted motion vector is not suitable, since the scaling process is not accurate.

According to some example embodiments, it is proposed to omit the scaling process of converting uni-predicted motion vectors to bi-predicted motion vectors. A VVC-standard encoder and a VVC-standard decoder implement deriving the scaled motion vector, when deriving a temporal merge candidate, from one of the motion vectors of the collocated CU, wherein the one of the motion vectors of the collocated CU is determined according to the following steps:

If the motion vector of the collocated CU is a bi-predicted motion vector and the current picture is a low delay picture, the L0 motion vector of the TMVP candidate is scaled from the L0 motion vector of the collocated CU and the L1 motion vector of the TMVP candidate is scaled from the L1 motion vector of the collocated CU.

Otherwise, if the motion of the collocated CU is a bi-predicted motion vector and the current picture is a non-low delay picture, which of the two motion vectors of the collocated CU is used to perform scaling is determined according to the reference picture list of the collocated CU: if the collocated CU is from the L0 reference picture list, the L0 and L1 motion vectors of the TMVP candidate are both scaled from the L1 motion vector of the collocated CU. Similarly, if the collocated CU is from the L1 reference picture list, the L0 and L1 motion vectors of the TMVP candidate are both scaled from the L0 motion vector of the collocated CU.

Otherwise, if the motion vector of the collocated CU is a L0-predicted motion vector, the L0 motion vector of the TMVP candidate is scaled from the L0 motion vector of the collocated CU regardless of whether the current picture is a low-delay picture or not, while the L1 motion vector of the TMVP candidate is set to be unavailable. Similarly, if the motion of the collocated CU is a L1-predicted motion, the L1 motion vector of the TMVP candidate is scaled from the L1 motion vector of the collocated CU, while the L0 motion vector of the TMVP candidate is set to be unavailable.

According to other example embodiments, the scaling process of converting uni-predicted motion to bi-predicted motion may be omitted only for lowest temporal layers, rather than all temporal layers. For example, when a temporal layer is lower than layer 3, scaling is omitted.

According to other example embodiments, the scaling process of converting uni-predicted motion to bi-predicted motion may be omitted only for lowest temporal layers and only for non-low delay pictures.

According to other example embodiments, the scaling process of converting uni-predicted motion to bi-predicted motion is omitted only for some merge modes, where these merge modes may be any, some, or all of: a regular merge mode; merge with MVD; a geometric partition mode; a combined inter and intra mode; a subblock-based temporal motion vector prediction; an affine merge mode; and a template matching mode.

According to other example embodiments, whether motion vectors of the TMVP candidate are derived by uni-predicted or bi-predicted motion is determined according to a cost value of template matching. A VVC-standard encoder and a VVC-standard decoder implement measuring the template matching cost by the sum of absolute differences between samples of a template of the current block and their corresponding reference samples. The template includes a set of reconstructed samples neighboring the current block. Reference samples of the template are located by the L0-predicted, L1-predicted and bi-predicted motion information of the temporal candidates.

It should be understood that template matching to decide uni-predicted motion vectors or bi-predicted motion vectors of a TMVP candidate is only performed when ARMC is enabled. Moreover, to simplify the implementation, when constructing the merge candidate list, a VVC-standard encoder and a VVC-standard decoder implement scaling, first, the TMVP candidate to a bi-predicted motion vector. Then, when ARMC is applied, the TMVP candidate may be converted to a uni-predicted motion vector based on the cost value of template matching.

According to other example embodiments, a VVC-standard encoder and a VVC-standard decoder implement adding an additional uni-predicted TMVP candidate when the motion of collocated CU is uni-predicted.

In one or more aspects, example embodiments of the present disclosure provide a VVC-standard encoder and a VVC-standard decoder implementing a temporal motion vector prediction candidate selection method utilizing multiple options in setting a reference picture index.

According to ECM, a reference picture index of a temporal merge candidate is set equal to zero. According to example embodiments of the present disclosure, a different reference picture index may be selected.

According to some example embodiments, a selected reference picture index is a reference picture index of a collocated picture whose scaling factor (i.e., tb/td as illustrated in FIG. 4) is the closest to 1.

According to other example embodiments, a selected reference picture index is a reference picture index most frequently selected for spatially neighboring blocks. The spatial neighboring blocks can be the spatial candidates, HMVP candidates or non-adjacent candidates as described above with reference to the VVC standard and ECM.

According to other example embodiments, a VVC-standard encoder and a VVC-standard decoder implement signaling a reference picture index at a sequence-level, picture-level, slice-level or CTU-level syntax structure.

According to other example embodiments, a VVC-standard encoder and a VVC-standard decoder implement selecting a different reference picture index per subblock when a block is coded using subblock-based temporal motion vector prediction ("SbTMVP") mode.

According to other example embodiments, a VVC-standard encoder and a VVC-standard decoder implement determining a consensus reference picture index for each sub-block based on per-subblock reference picture index selections when a block is coded using SbTMVP mode. For each subblock, first a reference picture index is selected, where the selected reference picture index is a reference index of a collocated picture whose scaling factor is closest to 1. Then, the reference picture index of the entire block is a reference picture index which is most frequently selected among each subblock.

In one or more aspects, example embodiments of the present disclosure provide a VVC-standard encoder and a VVC-standard decoder implementing a temporal motion vector prediction candidate selection method utilizing scaling factor offsetting.

According to ECM, a scaling factor is calculated using the POC distance as described above with reference to the VVC standard and ECM; however, it is observed that the scaling factor calculation is not accurate. Example embodiments of the present disclosure provide a VVC-standard encoder and a VVC-standard decoder implementing a scaling factor offset, to improve accuracy.

According to some example embodiments, the scaling factor may be offset as follows:

$$\text{scaling factor} = \frac{tb}{td} + \frac{1}{N} \times \frac{tb}{td}$$

Herein, tb denotes the POC difference between the reference picture of the current picture and the current picture; td denotes the POC difference between the reference picture of the collocated picture and the collocated picture; and N denotes a non-zero integer number (e.g., N is equal to ±8, ±16). Given a negative N, the scaling factor is adjusted to be smaller. Given a positive N, the scaling factor is adjusted to be larger.

According to other example embodiments, the scaling factor as offset above is influenced to be closer to 1. Given a scaling factor less than 1, N as defined above is set to a positive number. Given a scaling factor greater than 1, N is set to a negative number.

According to other example embodiments, a VVC-standard encoder and a VVC-standard decoder implement signaling the offset (i.e., the number N) at a sequence-level, picture-level, slice-level, or CTU-level syntax structure.

By way of example, when signaling the offset, the absolute value and the sign of the offset are both signaled.

By way of another example, when signaling the offset, only the sign of the offset is signaled. The absolute value is fixed to a default number.

By way of another example, the absolute value and the sign of the offset may be signaled at different levels: the absolute value is signaled at a sequence-level syntax structure, and the sign is signaled at a CTU-level syntax structure.

According to other example embodiments, the scaling factor is offset or non-offset individually for each CU. For each CU, a scaling factor may be offset or may be non-offset, according to any one of the following:

$$\frac{tb}{td}, \frac{tb}{td} + \frac{1}{N} \times \frac{tb}{td}, \frac{tb}{td} - \frac{1}{N} \times \frac{tb}{td}.$$

The template matching method is applied to select a most optimal offset or non-offset.

According to other example embodiments, the scaling factor may be offset per temporal layer. That is, each temporal layer may have a different scaling factor offset.

In one or more aspects, example embodiments of the present disclosure provide a VVC-standard encoder and a VVC-standard decoder implementing a merge candidate list building method omitting a temporal motion vector prediction candidate.

According to ECM, a temporal merge candidate is added to regular merge mode, geometric partition mode ("GPM"), merge mode with MVD ("MMVD"), combined inter and intra prediction ("CIIP"), SbTMVP and affine mode. It is observed that the temporal merge candidate is not always ultimately used in the coding.

According to some example embodiments, a VVC-standard encoder and a VVC-standard decoder implement conditionally adding a temporal merge candidate to a merge candidate list according to the motion information of neighboring blocks. When the temporal motion of a neighboring block is similar to the temporal motion of a current block and the motion of neighboring block is not obtained from the temporal motion, the TMVP candidate of the current block is treated as unavailable for adding to the merge candidate list.

Figure 8:
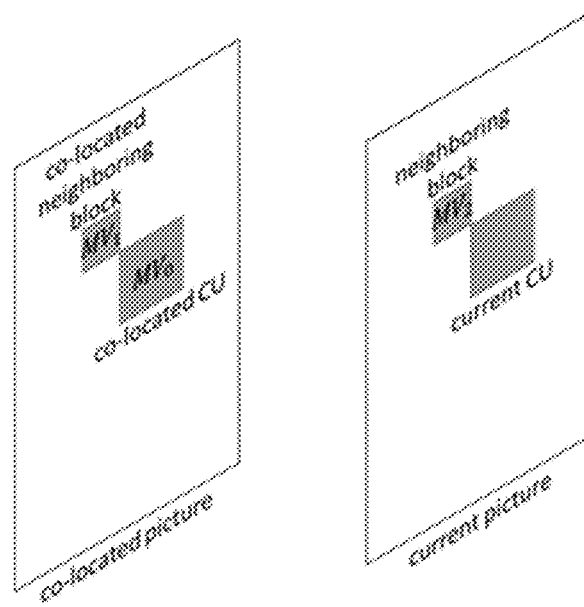
FIG. 8 illustrates adding a temporal merge candidate to a merge candidate list according to the motion information of neighboring blocks, according to example embodiments of the present disclosure.

FIG. 8 illustrates conditionally adding a temporal merge candidate to a merge candidate list according to the motion information of neighboring blocks, according to example embodiments of the present disclosure. In FIG. 8, motion vector $\overrightarrow{mv_0}$ is the motion vector of a current CU (equal to the motion of a collocated CU), motion vector $\overrightarrow{mv_1}$ is the motion vector of a neighboring block of the collocated CU, and motion vector $\overrightarrow{mv_2}$ is the motion vector of a neighboring block of the current CU. When $\overrightarrow{mv_0}$ is similar to $\overrightarrow{mv_1}$ and $\overrightarrow{mv_2}$ is not scaled from $\overrightarrow{mv_1}$, the temporal merge candidate will not be added the merge candidate list of current block.

The neighboring blocks can be any subset of $\{A_0, A_1, B_0, B_1, B_2\}$. The neighboring blocks can also be non-adjacent spatial merge candidates or HMVP merge candidates.

Similarity between the temporal motion vector of the current block and the temporal motion vector of the neighboring blocks is compared against a default threshold. When the motion vector difference is smaller than the default threshold, the two temporal motion vectors are treated as similar.

The default threshold is an integer number greater than 0. The default threshold may be set to different values depending on the coding mode of the current block or the size of the current block. For example, the default threshold is set to 1 for regular merge mode and is set to 16 for template matching mode.

According to other example embodiments, a VVC-standard encoder and a VVC-standard decoder implement an adaptive merge list construction order according to temporal layer, picture type (e.g., low delay picture or non-low delay picture), or the coding mode of the current CU. In one example, for higher temporal layers, the priority of a TMVP candidate is higher, causing a TMVP candidate to be preferentially added before a spatial merge candidate, thereby overriding the merge candidate order as described above.

In one or more aspects, example embodiments of the present disclosure provide a VVC-standard encoder and a VVC-standard decoder implementing a picture reconstruction method utilizing motion information refinement.

According to some example embodiments, after a current block coded with inter mode is reconstructed, the motion information is refined, including inter prediction direction (i.e., L0-predicted, L1-predicted, or bi-predicted), reference picture indices, and motion vectors. The reconstructed samples of the current block are used as a template, and motion estimation is performed.

When performing the motion estimation, only the distortion is considered. The refined motion information is then used as temporal motion for the future coding picture. The reconstructed samples used in motion estimation process may be the samples before or after loop filter process.

According to some example embodiments, when constructing a merge candidate list for regular merge mode, CIIP, GPM, MMVD and template matching mode, a VVC-standard encoder and a VVC-standard decoder implement treating the TMVP candidate of the current block as unavailable if the temporal motion of a neighboring block is similar to the temporal motion of a current block and the motion of neighboring block is not obtained from the temporal motion. In the case that the TMVP candidate is added to the merge candidate list, the TMVP candidate is derived as follows:

If the motion of the collocated CU is a bi-predicted motion, then regardless of whether the current picture is a low delay picture or not, the L0 motion vector of the TMVP candidate is scaled from the L0 motion vector of the collocated CU and the L1 motion vector of the TMVP candidate is scaled from the L1 motion vector of the collocated CU.

Otherwise, if the motion vector of the collocated CU is a L0-predicted motion vector, the L0 and L1 motion vectors of the TMVP candidate are both scaled from the L0 motion of the collocated CU regardless of whether the current picture is a low-delay picture or not. Similarly, if the motion vector of the collocated CU is a L1-predicted motion vector, the L0 and L1 motion vectors of the TMVP candidate are both scaled from the L1 motion vector of the collocated CU.

Moreover, a VVC-standard encoder and a VVC-standard decoder implement setting the reference picture index of the TMVP candidate to a reference picture index of a collocated picture whose scaling factor (i.e., tb/td as illustrated in FIG. 4) is the closest to 1. Moreover, when the ARMC is enabled and the current picture is a non-low delay picture, a VVC-standard encoder and a VVC-standard decoder implement applying the template matching method to decide whether the TMVP candidate is uni-predicted or bi-predicted, and to select a most optimal offset or non-offset scaling factor.

Persons skilled in the art will appreciate that all of the above aspects of the present disclosure may be implemented concurrently in any combination thereof, and all aspects of the present disclosure may be implemented in combination as yet another embodiment of the present disclosure.

Figure 9:
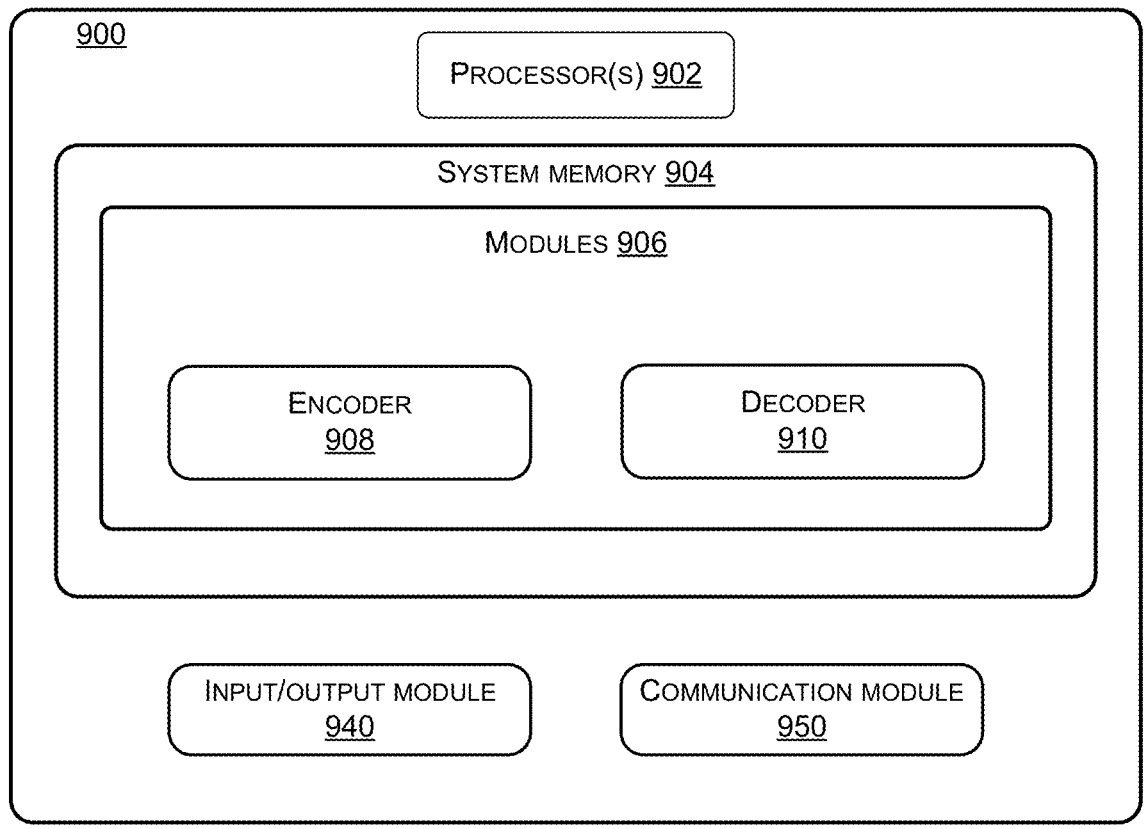
FIG. 9 illustrates an example system for implementing the processes and methods described above for implementing refined temporal motion candidate behavior.

FIG. 9 illustrates an example system 900 for implementing the processes and methods described above for implementing refined temporal motion candidate behavior.

The techniques and mechanisms described herein may be implemented by multiple instances of the system 900 as well as by any other computing device, system, and/or environment. The system 900 shown in FIG. 9 is only one example of a system and is not intended to suggest any limitation as to the scope of use or functionality of any computing device utilized to perform the processes and/or procedures described above. Other well-known computing devices, systems, environments and/or configurations that may be suitable for use with the embodiments include, but are not limited to, personal computers, server computers, hand-held or laptop devices, multiprocessor systems, microprocessor-based systems, set top boxes, game consoles, programmable consumer electronics, network PCs, minicomputers, mainframe computers, distributed computing environments that include any of the above systems or devices, implementations using field programmable gate arrays ("FPGAs") and application specific integrated circuits ("ASICs"), and/or the like.

The system 900 may include one or more processors 902 and system memory 904 communicatively coupled to the processor(s) 902. The processor(s) 902 may execute one or more modules and/or processes to cause the processor(s) 902 to perform a variety of functions. In some embodiments, the processor(s) 902 may include a central processing unit ("CPU"), a graphics processing unit ("GPU"), both CPU and GPU, or other processing units or components known in the art. Additionally, each of the processor(s) 902 may possess its own local memory, which also may store program modules, program data, and/or one or more operating systems.

Depending on the exact configuration and type of the system 900, the system memory 904 may be volatile, such as RAM, non-volatile, such as ROM, flash memory, miniature hard drive, memory card, and the like, or some combination thereof. The system memory 904 may include one or more computer-executable modules 906 that are executable by the processor(s) 902.

The modules 906 may include, but are not limited to, one or more of an encoder 908 and a decoder 910.

The encoder 908 may be a VVC-standard encoder implementing any, some, or all aspects of example embodiments of the present disclosure as described above, executable by the processor(s) 902 to configure the processor(s) 902 to perform operations as described above.

The decoder 910 may be a VVC-standard encoder implementing any, some, or all aspects of example embodiments of the present disclosure as described above, executable by the processor(s) 902 to configure the processor(s) 902 to perform operations as described above.

The system 900 may additionally include an input/output (I/O) interface 940 for receiving image source data and bitstream data, and for outputting reconstructed pictures into a reference picture buffer or DBP and/or a display buffer. The system 900 may also include a communication module 950 allowing the system 900 to communicate with other devices (not shown) over a network (not shown). The network may include the Internet, wired media such as a wired network or direct-wired connections, and wireless media such as acoustic, radio frequency ("RF"), infrared, and other wireless media.

Some or all operations of the methods described above can be performed by execution of computer-readable instructions stored on a computer-readable storage medium, as defined below. The term "computer-readable instructions" as used in the description and claims, include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

The computer-readable storage media may include volatile memory (such as random-access memory ("RAM")) and/or non-volatile memory (such as read-only memory ("ROM"), flash memory, etc.). The computer-readable storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transient computer-readable storage medium is an example of computer-readable media. Computer-readable media includes at least two types of computer-readable media, namely computer-readable storage media and communications media. Computer-readable storage media includes volatile and non-volatile, removable and non-removable media implemented in any process or technology for storage of information such as computer-readable instructions, data structures, program modules, or other data. Computer-readable storage media includes, but is not limited to, phase change memory ("PRAM"), static random-access memory ("SRAM"), dynamic random-access memory ("DRAM"), other types of random-access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. A computer-readable storage medium employed herein shall not be interpreted as a transitory signal itself, such as a radio wave or other free-propagating electromagnetic wave, electromagnetic waves propagating through a waveguide or other transmission medium (such as light pulses through a fiber optic cable), or electrical signals propagating through a wire.

The computer-readable instructions stored on one or more non-transitory computer-readable storage media that, when executed by one or more processors, may perform operations described above with reference to FIGS. 1A-8. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

Example embodiments of the present disclosure are further described by at least the following clauses.

A. A method, comprising: selecting, by one or more processors (902) of a computing system (900), a plurality of motion candidates for a current coding unit ("CU") of a current picture (706); wherein the one or more processors (902) derive, according to a motion vector (702) of a motion grid of the current picture (706), a Temporal Motion Vector Prediction candidate ("TMVP candidate") of a current CU of the current CTU (704) of a current picture (706) from a relocated collocated CTU (708) of a collocated picture (710), the relocated collocated CTU (708) being located in the collocated picture (710) by the motion vector (702) relative to the current CTU (704) in the current picture (706).

B. The method of paragraph A, wherein a motion grid size of a current CU and a collocated CU are different from a size of the current CTU (704) and the collocated CTU (708); and further comprising signaling the motion grid size of the current picture (706) at a sequence-level, picture-level or slice-level syntax structure.

C. The method of paragraph B, wherein signaling the motion grid size of the current CU comprises signaling a motion grid size of a highest temporal layer of the current picture (706) at a sequence-level syntax structure.

D. The method of paragraph B, wherein signaling the grid size of the current CU comprises decreasing a grid size for every lower temporal layer of the current picture (706) starting from a highest temporal layer of the current picture (706).

E. The method of paragraph B, wherein signaling the grid size of the current CU comprises increasing a grid size for every higher temporal layer of the current picture (706) starting from a lowest temporal layer of the current picture (706).

F. The method of paragraph A, wherein the motion vector (702) is not signaled in a syntax structure, and a parameter indicating the motion vector (702) sameness as another motion vector of a neighboring motion grid is signaled in a syntax structure.

G. The method of paragraph A, wherein the motion vector (702) is not signaled in a syntax structure, and a parameter indicating the motion vector (702) difference from another motion vector of a neighboring motion grid is signaled in a syntax structure.

H. The method of paragraph A, wherein: the motion vector (702) is signaled in a syntax structure, and; blocks of the motion grid are coded according to a default order among one of: raster scanning order, z-order scanning order, horizontal scanning order, vertical scanning order, and diagonal scanning order.

I. The method of paragraph A, further comprising signaling, at a sequence-level, picture-level, or slice-level syntax structure flag, a parameter indicating that a position of the collocated CTU (708) is relocated from the current CTU (704).

J. The method of paragraph A, without signaling, at a sequence-level, picture-level, or slice-level syntax structure flag, a parameter indicating that a position of the collocated CTU (708) is relocated from the current CTU (704).

K. A method, comprising: selecting, by one or more processors (902) of a computing system (900), a plurality of motion candidates for a current coding unit ("CU") of a current picture (706); wherein the one or more processors (902) select a Temporal Motion Vector Prediction candidate ("TMVP candidate") from a set of motion candidates including spatially neighboring blocks of a collocated picture (710) relative to the current CU.

L. The method of paragraph K, wherein the one or more processors (902) derive a TMVP candidate by averaging temporal motion vectors of a plurality of temporal candidates.

M. The method of paragraph K, wherein the one or more processors (902) derive a TMVP candidate by one among a plurality of temporal motion vector of temporal candidates yielding a largest motion vector difference in comparison with spatial merge candidates.

N. The method of paragraph K, wherein the one or more processors (902) derive a TMVP candidate by a motion vector of a temporal candidate having lowest cost value of template matching, a cost value of template matching comprising a sum of absolute differences between samples of a template of the current block and corresponding reference samples neighboring the current block.

O. The method of paragraph K, further comprising signaling, by the one or more processors (902), an index identifying a derived TMVP candidate in a syntax structure of a CTU, the syntax structure being at sequence-level, picture-level, slice-level, 64×64 grid-level, 32×32 grid-level, or 16×16 grid-level.

P. A method, comprising: selecting, by one or more processors (902) of a computing system (900), a plurality of motion candidates for a current coding unit ("CU") of a current picture (706); wherein the one or more processors (902) select a Temporal Motion Vector Prediction candidate ("TMVP candidate") by deriving a scaled motion vector from a motion vector of a collocated CU; wherein the scaled motion vector comprises a L0 motion vector and a L1 motion vector; wherein, for a bi-predicted motion vector of a collocated CU, the L0 motion vector is scaled from a L0 motion vector of the collocated CU and the L1 motion vector is scaled from a L1 motion vector of the collocated CU regardless of whether a current picture (706) is a low-delay picture; wherein, for a L0-predicted motion vector of a collocated CU, the L0 motion vector and the L1 motion vector are both scaled from a L0 motion vector of the collocated CU regardless of whether a current picture (706) is a low-delay picture; and wherein, for a L1-predicted motion vector of a collocated CU, the L0 motion vector and the L1 motion vector are both scaled from a L1 motion vector of the collocated CU regardless of whether a current picture (706) is a low-delay picture.

Q. A method, comprising: selecting, by one or more processors (902) of a computing system (900), a plurality of motion candidates for a current coding unit ("CU") of a current picture (706); wherein the one or more processors (902) select a Temporal Motion Vector Prediction candidate ("TMVP candidate") by deriving a scaled motion vector from a motion vector of a collocated CU; wherein the scaled motion vector comprises a L0 motion vector and a L1 motion vector; wherein, for a bi-predicted motion vector of a collocated CU, the L0 motion vector is scaled from a L0 motion vector of the collocated CU and the L1 motion vector is scaled from a L1 motion vector of the collocated CU in the event that a current picture (706) is a low-delay picture, or the L0 motion vector and the L1 motion vector are both scaled from a L0 motion vector of the collocated CU in the event that the collocated CU is from a L0 reference picture list and a current picture (706) is a low-delay picture, or the L0 motion vector and the L1 motion vector are both scaled from a L1 motion vector of the collocated CU in the event that the collocated CU is from a L1 reference picture list and a current picture (706) is a low-delay picture; wherein, for a L0-predicted motion vector of a collocated CU, the L0 motion vector is scaled from a L0 motion vector of the collocated CU and the L1 motion vector is set unavailable regardless of whether a current picture (706) is a low-delay picture; and wherein, for a L1-predicted motion vector of a collocated CU, the L0 motion vector is set unavailable and the L1 motion vector is scaled from a L1 motion vector of the collocated CU regardless of whether a current picture (706) is a low-delay picture.

R. The method of paragraph Q, wherein a temporal layer of the current CU is lower than layer 3.

S. A method, comprising: selecting, by one or more processors (902) of a computing system (900), a plurality of motion candidates for a current coding unit ("CU") of a current picture (706); wherein the one or more processors (902) select a Temporal Motion Vector Prediction candidate ("TMVP candidate") by deriving a scaled motion vector from a motion vector of a collocated CU; wherein the scaled motion vector comprises a L0 motion vector and a L1 motion vector; wherein, for a bi-predicted motion vector of a collocated CU, the L0 motion vector is scaled from a L0 motion vector of the collocated CU and the L1 motion vector is scaled from a L1 motion vector of the collocated CU in the event that a current picture (706) is a non-low-delay picture, or the L0 motion vector and the L1 motion vector are both scaled from a L0 motion vector of the collocated CU in the event that the collocated CU is from a L0 reference picture list and a current picture (706) is a low-delay picture, or the L0 motion vector and the L1 motion vector are both scaled from a L1 motion vector of the collocated CU in the event that the collocated CU is from a L1 reference picture list and a current picture (706) is a non-low-delay picture; wherein, for a L0-predicted motion vector of a collocated CU, the L0 motion vector is scaled from a L0 motion vector of the collocated CU and the L1 motion vector is set unavailable in the event that a current picture (706) is a non-low-delay picture; and wherein, for a L1-predicted motion vector of a collocated CU, the L0 motion vector is set unavailable and the L1 motion vector is scaled from a L1 motion vector of the collocated CU in the event that a current picture (706) is a non-low-delay picture.

T. The method of paragraph S, wherein a temporal layer of the current CU is lower than layer 3.

U. The method of any one of paragraphs Q, R, S, or T, wherein the plurality of motion candidates are selected for one of: a regular merge mode; merge with MVD; a geometric partition mode; a combined inter and intra mode; a subblock-based temporal motion vector prediction; an affine merge mode; and a template matching mode.

V. A method, comprising: selecting, by one or more processors (902) of a computing system (900), a plurality of motion candidates for a current coding unit ("CU") of a current picture (706); wherein the one or more processors (902) select a Temporal Motion Vector Prediction candidate ("TMVP candidate") by deriving a scaled motion vector from a motion vector of a collocated CU by either uni-predicted motion or bi-predicted motion, depending on a lowest cost value of template matching, a cost value of template matching comprising a sum of absolute differences between samples of a template of the current block and corresponding reference samples neighboring the current block.

W. The method of paragraph V, wherein the scaled motion vector is derived by scaling the TMVP candidate to a bi-predicted motion vector, then converting the bi-predicted motion vector to a uni-predicted motion vector.

X. The method of paragraph V, wherein the TMVP candidate comprises two TMVP candidates each derived by uni-predicted motion.

Y. A method, comprising: selecting, by one or more processors (902) of a computing system (900), a plurality of motion candidates for a current coding unit ("CU") of a current picture (706); wherein the one or more processors (902) select a Temporal Motion Vector Prediction candidate ("TMVP candidate"), and set a reference picture index of the TVMP candidate to a value other than zero.

Z. The method of paragraph Y, wherein the reference picture index comprises a reference picture index of a collocated picture whose scaling factor is closest to 1.

AA. The method of paragraph Y, wherein the reference picture index comprises one among a plurality of reference picture indices most frequently selected for spatially neighboring blocks.

AB. The method of paragraph Y, further comprising signaling, by one or more processors (902), the reference picture index at a sequence-level, picture-level, slice-level or CTU-level syntax structure.

AC. The method of paragraph Y, wherein a current block is coded using subblock-based temporal motion vector prediction ("SbTMVP") mode; and further comprising selecting at least some different reference picture indices for different subblocks of the current block.

AD. The method of paragraph Y, wherein a current block is coded using subblock-based temporal motion vector prediction ("SbTMVP") mode; and further comprising: selecting, for each subblock of the current block, a reference picture index of a collocated picture whose scaling factor is closest to 1; and determining a most frequently selected reference picture index among subblocks of the current block as a consensus reference picture index for the current block.

AE. A method, comprising: selecting, by one or more processors (902) of a computing system (900), a plurality of motion candidates for a current coding unit ("CU") of a current picture (706); wherein the one or more processors (902) select a Temporal Motion Vector Prediction candidate ("TMVP candidate") by deriving a scaled motion vector from a motion vector of a collocated CU by a scaling factor, the scaling factor being offset by addition to the scaling factor multiplied by an offset.

AF. The method of paragraph AE, further comprising signaling the offset at a sequence-level, picture-level, slice-level, or CTU-level syntax structure.

AG. The method of paragraph AF, wherein an absolute value of the offset and a sign of the offset are both signaled.

AH. The method of paragraph AF, wherein the absolute value and the sign are signaled at different-level syntax structures.

AI. The method of paragraph AF, wherein a sign of the offset is signaled and an absolute value of the offset is not signaled.

AJ. The method of paragraph AE, wherein the scaling factor is offset or non-offset individually for each CU of the current picture (706).

AK. The method of paragraph AE, wherein the scaling factor is different for each temporal layer of the current picture (706).

AL. A method, comprising: selecting, by one or more processors (902) of a computing system (900), a plurality of motion candidates for a current coding unit ("CU") of a current picture (706); wherein the one or more processors (902) do not select a Temporal Motion Vector Prediction candidate ("TMVP candidate") in the event that a motion vector of the current CU is similar to a motion vector of a neighboring block of a collocated CU, and a motion vector of a neighboring block of the current CU is not a scaled motion vector derived from the neighboring block of the collocated CU.

AM. The method of paragraph AL, wherein similarity is determined according to a similarity threshold based on at least one of a coding mode of a current block and a size of the current block.

AN. A method, comprising: selecting, by one or more processors (902) of a computing system (900), a plurality of motion candidates for a current coding unit ("CU") of a current picture (706); wherein the one or more processors (902) adaptively change an order of selecting the plurality of merge candidates based on at least one of: temporal layer of a current picture (706), whether the current picture (706) is low-delay or non-low-delay, and a coding mode of a current block.

AO. The method of paragraph AN, wherein the one or more processors (902) preferentially select a Temporal Motion Vector Prediction candidate ("TMVP candidate") before a Spatial Motion Vector Prediction candidate for a current picture (706) having a high temporal layer.

AP. A method, comprising: reconstructing, by one or more processors (902) of a computing system (900), an inter prediction-coded current block; performing, by the one or more processors (902), motion estimation using samples of the reconstructed block as a template, to generate refined motion information of the reconstructed block; and selecting, by the one or more processors (902) a Temporal Motion Vector Prediction candidate ("TMVP candidate") derived from the refined motion information of the reconstructed block.

What is claimed is:

1. A computing system, comprising:
   one or more processors, and
   memory communicatively coupled to the one or more processors, the memory storing a frontend application executable by the one or more processors that, when executed by the one or more processors, perform associated operations comprising:
   selecting a plurality of motion candidates for a current coding unit ("CU") of a current picture, wherein a Temporal Motion Vector Prediction candidate ("TMVP candidate") is selected by setting a reference picture index of the TMVP candidate to a reference picture index having a scaling factor closest to 1,
   wherein the scaling factor is determined based on a ratio between:
   a picture order count ("POC") difference between a reference picture of the current picture and the current picture, and
   a POC difference between a collocated picture and a reference picture of the collocated picture.

2. The computing system of claim 1, wherein the scaling factor comprises the ratio between:
   the POC difference between the reference picture of the current picture and the current picture, and
   the POC difference between the collocated picture and the reference picture of the collocated picture.

3. The computing system of claim 1, further comprising reordering the plurality of merge candidates according to Adaptive Reordering of Merge Candidates ("ARMC").

4. The computing system of claim 1, wherein a plurality of TMVP candidates of the plurality of merge candidates are reordered by cost values based on template matching, wherein a template matching cost value of a merge candidate comprises a sum of absolute differences ("SAD") between samples of a template of the current block and respective reference samples.

5. A method, comprising:
  selecting a plurality of motion candidates for a current coding unit ("CU") of a current picture, wherein a Temporal Motion Vector Prediction candidate ("TMVP candidate") is selected by setting a reference picture index of the TMVP candidate to a reference picture index having a scaling factor closest to 1,
  wherein the scaling factor is determined based on a ratio between:
    a picture order count ("POC") difference between a reference picture of the current picture and the current picture, and
    a POC difference between a collocated picture and a reference picture of the collocated picture.

6. The method of claim 5, wherein the scaling factor comprises the ratio between:
  the POC difference between the reference picture of the current picture and the current picture, and
  the POC difference between the collocated picture and the reference picture of the collocated picture.

7. The method of claim 5, further comprising reordering the plurality of merge candidates according to Adaptive Reordering of Merge Candidates ("ARMC").

8. The method of claim 5, wherein a plurality of TMVP candidates of the plurality of merge candidates are reordered by cost values based on template matching, wherein a template matching cost value of a merge candidate comprises a sum of absolute differences ("SAD") between samples of a template of the current block and respective reference samples.

9. A non-transitory computer-readable storage medium storing a bitstream of a video for processing according to a method comprising:
  parsing, by one or more processors of a computing system and in response to receiving the bitstream, a merge index signaled in a syntax structure of a coding unit ("CU");
  selecting, by the one or more processors and in response to receiving the bitstream, a plurality of motion candidates for the CU, wherein a Temporal Motion Vector Prediction candidate ("TMVP candidate") is selected by setting a reference picture index of the TMVP candidate to a reference picture index having a scaling factor closest to 1,
  wherein the scaling factor is determined based on a ratio between:
    a picture order count ("POC") difference between a reference picture of the current picture and the current picture, and
    a POC difference between a collocated picture and a reference picture of the collocated picture; and
  performing, by the one or more processors and in response to receiving the bitstream, inter prediction of the CU by applying merge mode based on the merge index and the plurality of motion candidates.

10. The non-transitory computer-readable storage medium of claim 9, wherein the scaling factor comprises the ratio between:
  the POC difference between the reference picture of the current picture and the current picture, and
  the POC difference between the collocated picture and the reference picture of the collocated picture.

11. The non-transitory computer-readable storage medium of claim 9, wherein the method further comprises reordering the plurality of merge candidates according to Adaptive Reordering of Merge Candidates ("ARMC").

12. The non-transitory computer-readable storage medium of claim 9, wherein a plurality of TMVP candidates of the plurality of merge candidates are reordered by cost values based on template matching, wherein a template matching cost value of a merge candidate comprises a sum of absolute differences ("SAD") between samples of a template of the current block and respective reference samples.

* * * * *